Jan. 12, 1932.     J. B. BERRIGAN ET AL     1,840,930
SETTLING AND FILTERING MEANS FOR SLUDGE
Filed June 14, 1929
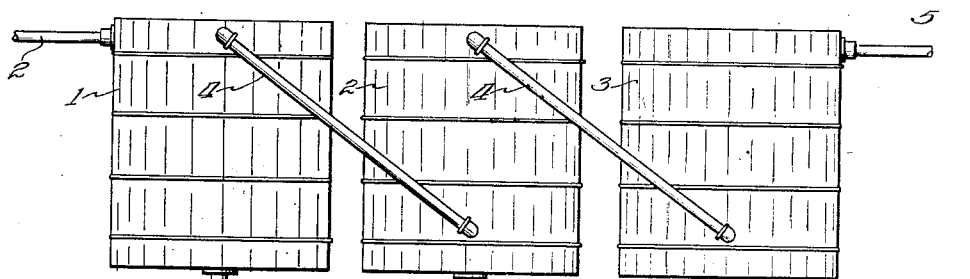
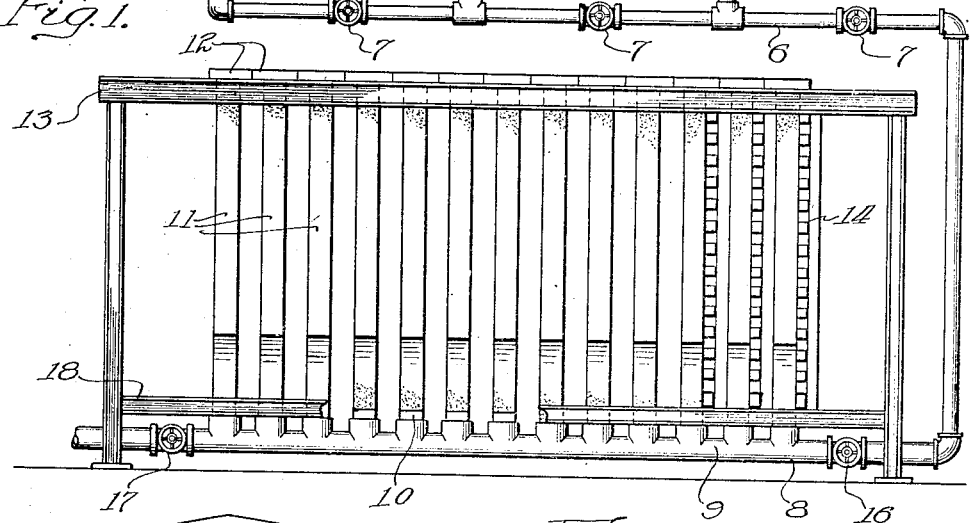
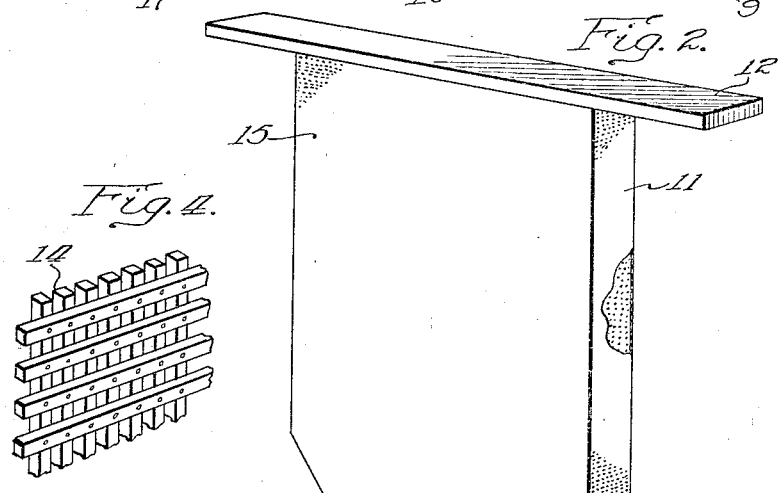
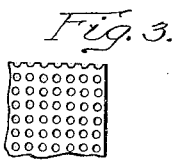

Patented Jan. 12, 1932

1,840,930

UNITED STATES PATENT OFFICE

JOHN B. BERRIGAN, OF OAK PARK, AND JOHN J. BERRIGAN, DECEASED, LATE OF OAK PARK, ILLINOIS, BY JOHN B. BERRIGAN, ADMINISTRATOR, OF OAK PARK, ILLINOIS, ASSIGNORS TO THE PRESS & DRIER CO.

SETTLING AND FILTERING MEANS FOR SLUDGE

Application filed June 14, 1929. Serial No. 370,962.

This invention relates to apparatus for reducing the water content of fluid substances such as the activated sludge from sewage disposal plants.

It is customary in this art to pump the sludge from the bottom of settling tanks and then deliver it to hydraulically operated filter presses. The apparatus is costly and requires in its operation considerable labor such as opening the bags at the end of an operation and the preparatory work for succeeding operations, and frequent repairs to or replacement of the filter bags because of breakage under pressure.

The purpose of the present invention is to avoid the expense incident to mechanically or hydraulically operated presses by providing settling and filtering means which is operated merely by the natural action of settling and filtering through the weight of the fluid treated.

These objects are accomplished by a construction such as shown in the accompanying drawings in which:

Figure 1 is a diagram showing in side elevation the improved settling and filtering apparatus.

Fig. 2 is a perspective view of a single filtering unit.

Fig. 3 is a magnified detail showing a fragment of the metallic filter.

Fig. 4 is a fragmentary detail of a wood lattice for use between and in contact with the filter units for the purpose of drawing water out of the filter by capillary action.

The general features of the settling and filtering apparatus are a series of secondary settling tanks which receive sludge from primary settling tanks and are connected in series by conduits, provided with a suitable overflow outlet for clear water and a piping arrangement for receiving heavy sludge from the bottom of the tanks and conducting it to the improved filter.

The latter consists of a plurality of separate filter units arranged side by side and each communicating at its bottom end with the supply conduit which also serves as an outlet conduit for the filtered sludge. Valves are arranged for controlling the filling of the filter and emptying thereof.

Referring to Fig. 1 sludge from the primary settling tanks flows into tank 1 from conduit 2, and from this tank in succession to a plurality of such tanks 2 and 3 through the inclined conduits 4. Each of the conduits 4 leads from the top of one tank to a lower point in one of the other tanks.

Clear water flows from the upper end of the last tank 3 through conduit 5. Each settling tank communicates at its lower end with a discharge conduit 6 under the control of shut-off valves 7. The conduit 6 leads to a special cast conduit 8 having upstanding flanges 9 for encircling the rectangular throats 10 at the bottom of each filter unit 11. Each filter unit at its upper end is attached to a transversely extending support 12 resting upon frame structure 13. A removable wood lattice 14 such as indicated in Fig. 4 is supported on channel bars 18 of frame 13 between the filter units in contact with the perforated metal sides 15 thereof.

The perforations in the filtering bags are minute, about the size of pin holes, forming capillary openings through which the moisture passes under the force of the static pressure within the filtering units. The surface tension of the liquid at the outside of the capillary holes is broken because of contact with the lattice work, thus starting a flow which wets the outer surface of the filtering bags. When the outer surfaces of the bags are wet, a fairly rapid draining of clear water is then possible.

Valves 16 and 17 control the filling and emptying of the filtering bags 11.

The operation of the settling and filtering apparatus includes a predetermined period of settling in the tanks 1, 2 and 3 with the valve 7 closed. The heavy sludge from the bottom of the settling tanks is then permitted to flow into the filters 11 with valve 17 closed and valves 7 and 16 open. When filled, valve 16 is also closed for the period required for filtering and draining from the lattices 14 such quantity of water as is required for fitting the sludge for a succeeding drying operation. The sludge is then in proper condition for treatment by the method and drying apparatus disclosed in our copending applications for patent No. 276,420, filed May 9, 1928, and No. 370,963, filed June 14, 1929.

The filter bags 11 preferably taper at their bottom ends toward the throat 10. The weight of the fluid therein assists in forcing water through the fine apertures in the metal sides of the filter bags, but the lattices 14 or some equivalent thereof are necessary in the process of rapidly drawing moisture through the filters.

The condensed activated sludge is a heavy, clay-like substance, and would tend to greatly clog the perforations in the filter bags if it were not for the action of the lattices or wood strips in contact therewith. In emptying the filter bags, valve 16 is closed and valve 17 is opened. The filtered sludge is heavy and settles out of the filter bags, leaving the filter in condition for a succeeding operation.

Although but one specific embodiment of the invention has been herein shown and described, it will be understood that numerous details of the construction shown may be altered or omitted without departing from the invention as defined by the following claims.

What is claimed is:

1. A filtering apparatus comprising a supporting frame, a plurality of flat metal bags mounted in said frame, the walls of said metal bags being provided with numerous capillary perforations, and means comprising absorbent material cooperating with the outer surfaces of said bags for breaking the surface tension of liquid at said perforations and without deforming said bag.

2. A filtering apparatus comprising a supporting frame, a plurality of flat metal bags mounted in parallel relation in said frame, the walls of said metal bags being provided with numerous capillary perforations, and lattices of porous absorbent material separating said bags and in contact with the perforated walls thereof and without deforming said bag.

Signed at Chicago this 24th day of March, 1930.

JOHN B. BERRIGAN.
JOHN B. BERRIGAN,
*Administrator of John J. Berrigan, Deceased.*